(No Model.)
J. H. DICKEY.
HARVESTER CHAIN RAKE.
No. 276,008. Patented Apr. 17, 1883.
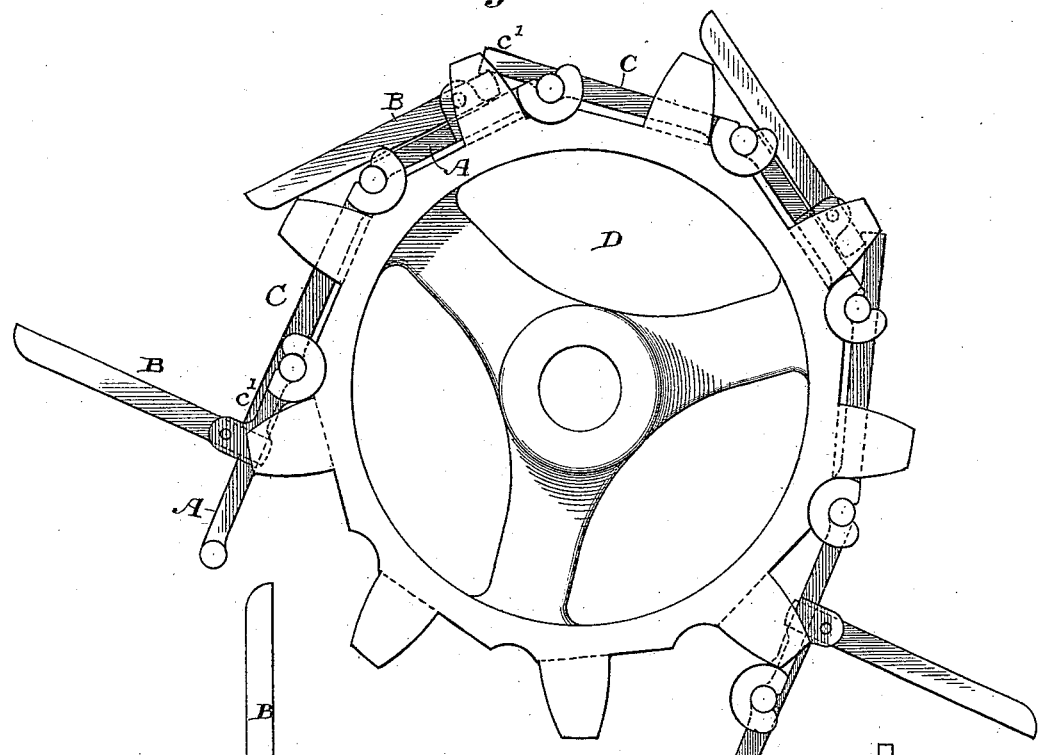
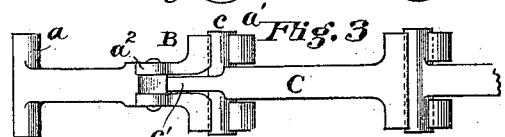
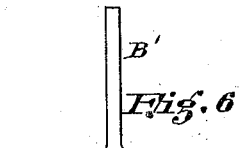
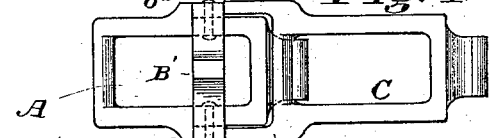
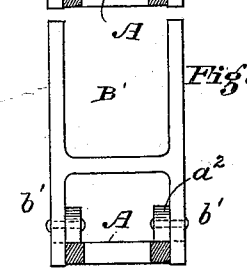
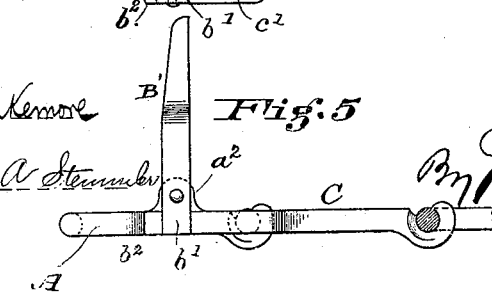
N. PETERS, Photo-Lithographer, Washington, D. C.

UNITED STATES PATENT OFFICE.

JAMES H. DICKEY, OF SPARTA, ILLINOIS, ASSIGNOR OF ONE-HALF TO CHARLES COLAHAN, OF CLEVELAND, OHIO.

HARVESTER CHAIN-RAKE.

SPECIFICATION forming part of Letters Patent No. 276,008, dated April 17, 1883.

Application filed October 7, 1882. (No model.)

*To all whom it may concern:*

Be it known that I, JAMES H. DICKEY, of Sparta, in the county of Randolph and State of Illinois, have invented certain new and useful Improvements in Harvester Chain-Rakes, of which the following is a specification.

My invention relates to that class of raking-chains carrying teeth pivoted to their links, whether said links are separable or permanently attached to each other, which teeth project through slots in the platform, as the chain moves onward, to push the grain before them.

Heretofore guides or ledges have been provided, fixed to the frame-work and running parallel with said chains, to receive a heel projection or shoe from the teeth, or from a bar to which they are attached, and lift them into a raking position as long as they are traversing the platform, but permit them to fall back and be withdrawn from the grain as they pass around the sprocket wheels or rollers at the end of said platform, or at the head of the elevator. In my invention I propose to provide such chains in themselves with means whereby the teeth will be automatically lifted or projected at right angles with the length of the chain— that is, into a raking position—during the time the chain is stretched tense between its supporting sprocket wheels or rollers, but permitted to fall back or fold upon their pivots as soon as the chain is bent in passing around one or the other of said wheels.

In the drawings, Figure 1 is a side elevation of a sprocket-wheel and raking-chain embodying my invention. Fig. 2 is a detail in elevation of one of the raking-teeth and two adjoining chain-links; Fig. 3, a top plan view of the parts in the foregoing figure; Figs. 4 and 5, a plan view and side elevation of a modification of the chain, and Figs. 6 and 7 a second and third modification.

A represents a chain-link of a common form, having a T-head, $a$, at one end and hooks $a'$ at the other, whereby it may be removably connected with similar links, as now customary in harvester-chains. Upon the body of this link are formed ears $a^2$, and it is slotted longitudinally from its hooked end past said ears, so that a tooth finger or arm, B, may be pivoted therein, with its heel projecting into the slot, and resting, when the finger is vertical, against the back of said slot. A second link, C, having at one end hooks for the reception of the T-head of a third link, is pivoted within the hooks of the first by means of trunnions, which in effect correspond to the T-heads of the first and third links, and beyond these trunnions is provided with a tongue, $c'$, which projects into the slot of the link A to such an extent as to abut against the side of the finger at its heel end, below the pivot, when the latter is in a vertical position, and when the links are in line with each other, the other side of the finger at this point coming, as just stated, against the end of the slot, whereby it will be held substantially rigid with its link and from play upon its pivot so long as the end of the tongue is against it. Thus during that part of the traverse of the chain in which it is held tense or taut between its sprocket-wheels the raking-fingers will be elevated, as all the links will be substantially in line with each other; but at the moment that the chain begins to move around either of its sprocket-wheels—as, for instance, the wheel D—the links will be bent or flexed upon each other, the tongue upon the link C, which will be the link in advance, will be lifted away from the side of the raking-finger, as represented in Fig. 1, and the latter will be permitted to fall back upon its pivot, so as to be withdrawn from the grain. When the chain again leaves the sprocket-wheel, upon its return to the opposite wheel, as in the lower part of said figure, the links will once more be brought in line, each with each, and the fingers will be forced out by the action of the tongue as it strikes their heel ends and travels down them in assuming said alignment.

When the chain is composed of open or rectangular links, such as shown in Fig. 4 and remaining figures, the raking-finger may be formed with two arms, $b'$, saddling one of said links, pivoted to lugs at the sides thereof, and playing against shoulders $b^2$ at said sides, and the second link may be provided with arms or tongues, one at each side of the first, projecting in advance of its pivot to act against the heel ends of the raking-finger, as before; or, instead of this, the raking-finger may be made double, as in Fig. 7, and the links formed as just described.

Various other modifications may be employed, the essential feature of my invention being that the raking-finger is pivoted to one of the links, and acted upon by an arm or tongue from the adjacent link in such manner that as the chain is straightened this arm or tongue will push the finger into a raking position, and as the chain is flexed it will be moved away from the finger, so as to permit the latter to fold upon its pivot and lie flat against the surface of the link.

I claim—

1. The combination, in a harvester chain-rake, of a link, a raking tooth or finger pivoted thereto, and a second link pivoted to the first, and provided with an arm or tongue arranged in such manner as to move the finger into raking position, or allow it to fold out of such position, according to the direction of the chain.

2. The combination of the link A, the finger B, pivoted thereto, and the link C and its tongue, taking into a slot in the first-named link, and abutting against the side of the raking-finger at its heel end when the links are in line with each other, substantially as described.

JAMES H. DICKEY.

Witnesses:
THOS. F. ALEXANDER,
ALBERT CROZIER.